US007143054B2

(12) United States Patent
Doherty

(10) Patent No.: US 7,143,054 B2
(45) Date of Patent: Nov. 28, 2006

(54) ASSESSMENT OF COMMUNICATION STRENGTHS OF INDIVIDUALS FROM ELECTRONIC MESSAGES

(75) Inventor: Michael Emmett Doherty, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 994 days.

(21) Appl. No.: 09/897,577

(22) Filed: Jul. 2, 2001

(65) Prior Publication Data

US 2003/0055711 A1    Mar. 20, 2003

(51) Int. Cl.
   *G06F 17/30*    (2006.01)
(52) U.S. Cl. ....................................... 705/10
(58) Field of Classification Search ............... 705/10
   See application file for complete search history.

(56) References Cited

U.S. PATENT DOCUMENTS

| | | | | |
|---|---|---|---|---|
| 6,151,585 | A * | 11/2000 | Altschuler et al. ........... | 705/10 |
| 6,414,691 | B1 * | 7/2002 | Nakagawa et al. ......... | 345/619 |
| 2002/0062368 | A1 * | 5/2002 | Holtzman et al. .......... | 709/224 |
| 2005/0049908 | A2 * | 3/2005 | Hawks ....................... | 705/10 |

FOREIGN PATENT DOCUMENTS

| | | | |
|---|---|---|---|
| EP | 1 065 607 A2 * | 1/2001 | |
| JP | 11-161670 A * | 6/1999 | |
| JP | 11-328275 A * | 11/1999 | |

OTHER PUBLICATIONS

Price, L. and L. F. Feick, "The Market Maven: A Diffuser of Marketplace Information", *Journal of Marketing*, Jan. 1987, vol. 51, pp. 83-97.

Matthews, R., "Six Degrees of Separation", *Worldlink*, Jan./Feb. 2000, pp. 17-18.

Watts, D., "Kevin bacon, the Small-World, and Why It All Matters", Santa Fe Institute Bulletin, Fall 1999, vol. 14, No. 2, 6 pages.

Hayes, B., "Graph Theory in Practice: Part I", *American Scientist*, Jan.-Feb. 2000, vol. 88, No. 1, pp. 9-13.

Hayes, B., "Graph Theory in Practice: Part II", *American Scientist*, Mar.-Apr. 2000, vol. 88, No. 2, pp. 104-109.

Gibson, D., J. Kleinberg and P. Ragha Van, "Inferring Web Communities from Link Topology", *Proceedings of 9th ACM Conference on Hypertext and Hypermedia*, 1998, pp. 225-234.

Kleinberg, J., "Authoritative Sources in a Hyperlinked Environment", *Proceedings on the ACM-SIAM Symposium on Discrete Algorithms*, 1998, pp. 668-677.

(Continued)

*Primary Examiner*—Susanna M. Diaz
(74) *Attorney, Agent, or Firm*—Leonard W. Lewis

(57) ABSTRACT

An apparatus, program product, and method analyze electronic messages directed between individuals to quantitatively assess the relative communication capabilities of such individuals. A quantitative value referred to as "communication strength" is determined for one or more individuals from a plurality of individuals based upon analysis of the electronic messaging activities of such individual(s), and is subsequently used to select an individual from among the plurality of individuals, e.g., for the purpose of selecting a target for a viral marketing encounter, a market research project, etc. The communication strength of an individual is determined by modeling a plurality of conversations identified through analysis of a plurality of electronic messages generated by the plurality of individuals, where each conversation is associated with a talker and a listener from the plurality of individuals, and is useful in determining a level of messaging activity between the talker and listener associated with such conversation.

18 Claims, 8 Drawing Sheets

OTHER PUBLICATIONS

Brin, S. and L. Page, "Anatomy of a Large Scale Hypertextual Web Search Engine", Computer Science Department, Stanford University, Stanford CA, 1998, pages 1-17.

Newman, M.E.J., "Who is the Best Connected Scientist" A Study of Scientific Coauthorship Networks, Santa Fe Institute, Santa Fe, NM, pp. 1-32.

Newman, M.E.J., "The Structure of Scientific Collaboration Networks", *Proceedings of the national Academy of Sciences USA*, 2001, vol. 98, No. 1, pp. 404-409.

Viegas, F.B. and J.S. Donath, "Chat Circles", MIT Media Lab, May 1999, ACM, *CHI '99*, Pittsburgh, PA, pp. 9-16.

Smith, M.A., S.D. Farhnham and S.M. Drucker, The Social Life of Small Graphical Chat Spaces, Microsoft Research, *CHI Letters*, Apr. 2000, vol. 2, Issue 1, pp. 462-469.

Whittaker, S., L. Terveen, W. Hill and L. Cherny, "The Dynamics of Mass Interaction", ATT Labs-Research, Florham Park, NJ, 1998, 8 pages.

Smith, M.A., "Some Social Implications of Ubiquitous Wireless Networks", ACM Mobile Computing and Communications Review, Apr. 2001, vol. 4 No. 2, 9 pages.

Burson-Marstellar, , The e-fluentials, 2000, pp. 1-11.

Amento, B., L. Terveen and W. Hill, "Does 'Authority' Mean Quality Predicting Expert Quality Ratings of Web Documents", AT&T Shannon Laboratories, Florham Park, NJ, *SIGR*, 2000, pp. 296-303.

Smith, M.A., "Invisible Crowds in Cyberspace: Mapping the Social Structure of the Usenet", *Communities in Cyberspace: Perspectives on New Forms of Social Organization*, London, Routledge Press, 1999, pp. 1-35.

Smith, M.A. and A.T. Fiore, "Visualization Components for Persistent Conversations", Microsoft Research, Redmond, WA, *ACM SIG CHI 2001*, 1999, 8 pages.

\* cited by examiner

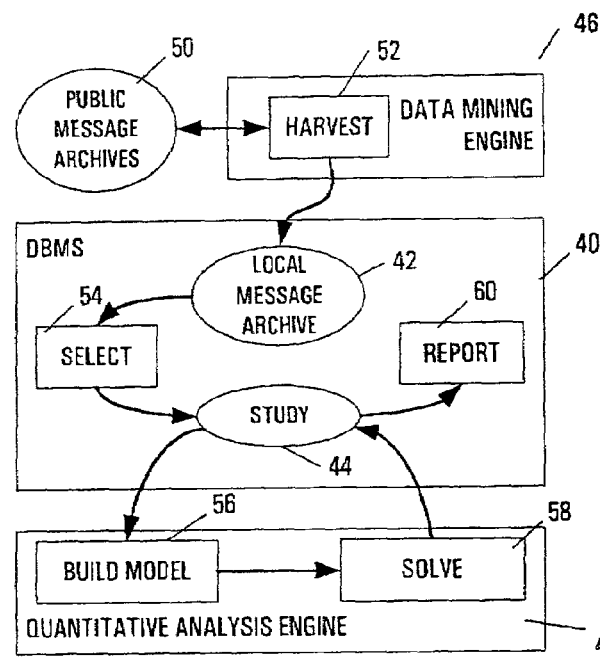
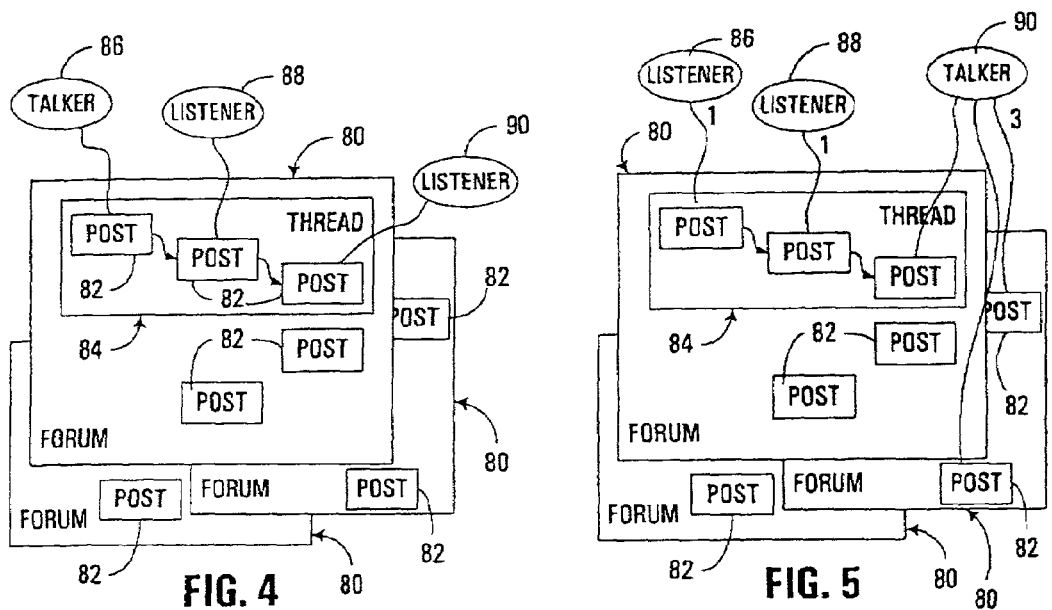

ASSESSMENT OF COMMUNICATION STRENGTHS OF INDIVIDUALS FROM ELECTRONIC MESSAGES

FIELD OF THE INVENTION

The invention is generally related to marketing and computer analysis of electronic media in connection with the same. More particularly, the invention is related to the quantitative analysis of electronic messages for the purpose of improving marketing efficacy.

BACKGROUND OF THE INVENTION

Marketing techniques have substantially improved in terms of sophistication and efficacy since the days of undirected mass-market advertisements and the like. Marketing campaigns, in particular, desirably balance the number of "impressions" or contacts with consumers with the quality of those impressions and the overall cost of the campaign. The efficacy of a marketing campaign is largely premised on getting the most "bang for the buck", i.e., the greatest impact for the marketing dollar.

Marketing efforts often vary in the degree in which they "target" specific consumers. Whereas mass marketing efforts generally target a large audience with little or no focus towards particular types of consumers, many direct marketing campaigns are generally targeted toward those consumers who are most likely to respond favorably to a marketing impression.

One specific type of marketing technique is known as viral, or diffusion, marketing. With viral marketing, the recipient of an encounter or impression is desirably used to relay a marketing message to other consumers. Viral marketing thus exemplifies a somewhat more sophisticated form of "word of mouth" advertising. To maximize the efficacy of a viral marketing campaign, therefore, it is desirable to direct encounters toward only those recipients who are most likely to relay marketing messages to others, and thus who are most capable of maximizing the viral relay effect.

In terms of viral marketing, research has found that certain types of individuals, typically referred to as "mavens", "connectors" and "salespersons", are critical to applying the viral social phenomenon to effective marketing campaigns. Mavens are typically collectors of information who are motivated to distribute information to other individuals, predominantly due to a social motivation. Connectors are individuals who communicate information of interest to themselves to an unusually large number of other people. Some connectors may merely be "enthusiasts" who effectively relay information to others only pertaining to a narrow area of interest. Other connectors, however, may be likely to convey information to others on a wide number of topics outside of their particular areas of interest. For example, a connector who has a particular area of expertise in musical instruments might still be inclined to relate to others about a wonderful dining experience that he or she recently had at a particular restaurant.

Initiation of viral marketing events through the use of mavens and connectors also requires the addition of "persuasion" into a social interaction. Thus, an individual functioning as a salesperson is often required to initiate a desirable viral marketing encounter.

Traditionally, the identification of suitable targets for viral marketing efforts has been through surveys and other manual, and often haphazard, processes. However, with the advent of electronic communications, and in particular the growth of the Internet, the opportunity exists to utilize computers and data processing techniques to assist in better targeting marketing efforts. In particular, with respect to viral marketing, it has been found that individuals who are influential in the physical or real world (i.e., the "physical environment") are often influential within the electronic, or "cyber" world (i.e., the "electronic environment"), as well. Thus, it is believed that the identification of individuals who are influential within electronic environments may assist in identifying desirable targets for marketing efforts in both physical and electronic environments.

The Internet, in particular, is interesting from a sociological standpoint for the manner in which "online communities" are formed by different individuals based upon particular areas of interest to those individuals. Moreover, the very nature of the Internet, and in particular the subset of the Internet known as the "World Wide Web" (or simply "the Web"), presents social and marketing researchers with a vast repository of data from which useful trends and relationships may be obtained. For example, research has been devoted to identifying the kinds and qualities of the groups and institutions that people create and use on the Internet, as well as to spot online trends and/or detect customer likes and dislikes from forums and other enthusiast communities, etc.

Also, the interactions of individuals and other entities have been researched to assist in other useful endeavors. For example, research has been devoted to improving searching technologies, and in particular, the results returned in response to search queries, based upon the links between different information repositories accessible via the Internet. For example, one avenue of research has been directed to analyzing the hypertext links between various Internet content items to determine the relative quality or "authority" of a particular content item accessible via the Internet.

One particular avenue of research, for example, is based on the premise that the authority of a particular content item can be assessed based upon the number of links to that item by other content items. Furthermore, to make such an assessment, content items are segregated into "hubs" and "authorities". Hubs are typically directory-type content items that provide relatively large numbers of links to other content items, much like a telephone directory. Authorities are typically the end use content items that are desirably returned as search results. Assessment of authority is premised further on the dual propositions that (1) a good hub links to many good authorities, and (2) a good authority is linked to by many good hubs. Such dual propositions are then modeled for a particular search space, and quantitative analysis is performed to attempt to simultaneously resolve these dual propositions, typically using an analysis technique such as the eigenvalue technique. Using this type of quantitative analysis, search results may be arranged so as to favor content items that are assessed to have greater authority by virtue of their links to greater numbers and qualities of other content items.

While the aforementioned quantitative analysis techniques have been used in connection with deriving certain types of information from the Internet and other electronic environments, quantitative analysis techniques have not been effectively utilized in connection with the identification of individuals having particular communication capabilities. In particular, quantitative analysis techniques have not been used to analyze individuals' electronic messaging activities to attempt to identify particular individuals who might be useful in connection with marketing activities such as viral marketing campaigns and market research.

The Internet, in particular, presents an ever-growing repository of information regarding individuals and the manners in which they communicate, in particular with respect to the electronic messages that individuals author and convey to others. The electronic messages created and maintained within electronic environments and media such as news archives and forums, list servers, chat rooms, etc. often present a wealth of information regarding the individuals that participate in such environments. Moreover, in many instances, the messages are relatively well categorized and capable of being searched to harvest relevant information about a particular topic. As an example, Internet forums are typically devoted to a particular area or field of interest. With those forums, members often post messages about particular topics or questions that interest them, and other members reply to those messages with answers or further discussions. The original messages and the replies thereto are often grouped into "threads" that present entire discussions in a cohesive manner.

A significant need therefore exists in the art for a manner of quantitatively assessing the communication capabilities of various individuals participating in electronic environments. In particular, a significant need exists in the art for a manner of quantitatively assessing the communication capabilities of individuals to assist in improving the efficacy of marketing activities, such as viral marketing and market research.

SUMMARY OF THE INVENTION

The invention addresses these and other problems associated with the prior art by providing an apparatus, program product, and method that analyze the various electronic messages directed between multiple individuals to quantitatively assess the relative communication capabilities of such individuals. Given the wide availability of electronic messaging archives of various types, and in particular the wide availability of public messaging archives, the identification of individuals having particular communication capabilities in either or both of the electronic and physical worlds can be substantially facilitated through the analysis of such archives, and thus used to improve the efficacy of marketing activities.

In particular, consistent with the invention a quantitative value referred to as "communication strength" is determined for one or more individuals from a plurality of individuals based upon analysis of the electronic messaging activities of such individual(s), and is subsequently used to select an individual from among the plurality of individuals, e.g., for the purpose of selecting a target for a viral marketing encounter, a market research project, etc. The communication strength of an individual is determined by modeling a plurality of conversations identified through analysis of a plurality of electronic messages generated by the plurality of individuals. Each conversation is associated with a talker and a listener from the plurality of individuals, and is useful in determining a level of messaging activity between the talker and listener associated with such conversation.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the sequence of operations in performing communication assessment in the apparatus of FIG. 2.

FIG. 4 is a block diagram of an electronic medium archive, illustrating a first, restrictive talker-listener criterion.

FIG. 5 is a block diagram of an electronic medium archive, illustrating a second, loose talker-listener criterion.

DETAILED DESCRIPTION

Figure 1:
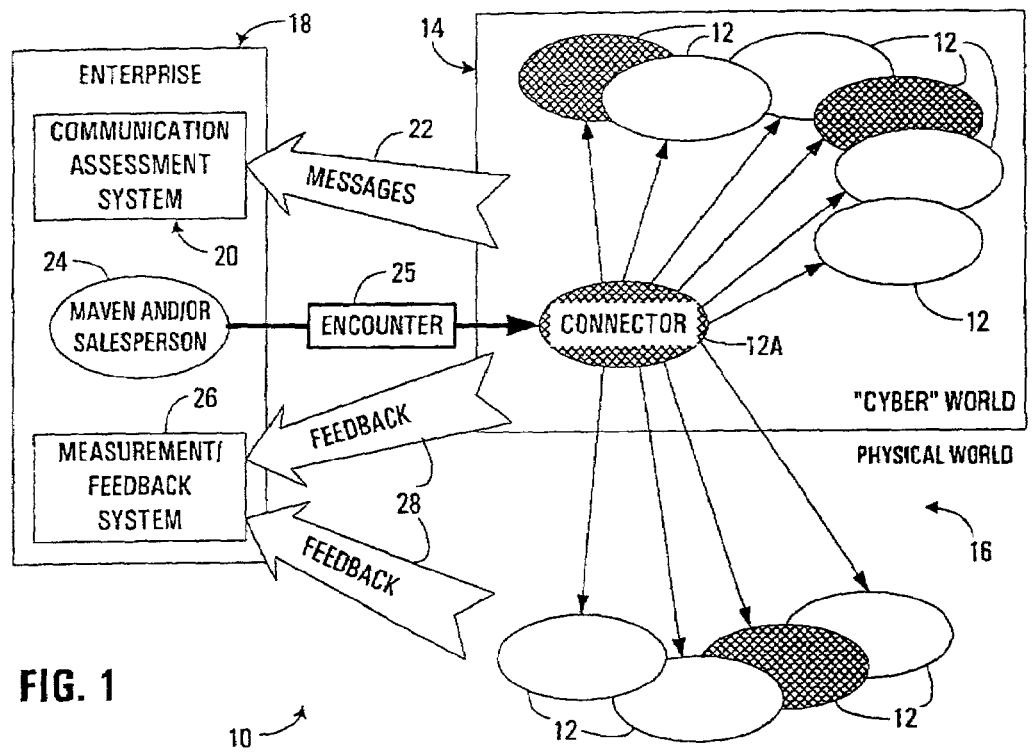
FIG. 1 is a block diagram of a viral marketing architecture incorporating communication assessment of electronic media consistent with the invention.

The embodiments described herein assess the communication strengths of individuals participating in an electronic environment based upon analysis of electronic messages with which those individuals are associated. In general, communication assessment consistent with the invention may be utilized in connection with electronic messages of differing types, as well as electronic messages found in various electronic environments. For example, communication assessment may be performed on various types of electronic messages such as emails, message posts, telephone records, "instant messages", chat sessions, and combinations thereof, whether incorporating text, image data, animation, video, audio, and/or other electronic information. Moreover, such messages may be retrieved from electronic environments such as news archives, forum archives, mailing (listserv) list archives, chat archives, instant messaging archives, telephone record archives, email archives, etc.

In general, electronic messages are analyzed to identify "conversations," where each conversation is associated with both a "talker" and a "listener", where the conversation is considered to be directed "from" a talker and directed "to" a listener. In the context of individual conversations, a talker may be, for example, an author, sender and/or other originator of a message, while a listener is typically someone who is a recipient of a message. As will become more apparent below, however, when a set of conversations is analyzed during a communication assessment study, individuals that meet predetermined talker and listener criteria are designated either as talkers or listeners for the entire set of conversations being analyzed, thus representing the predominant role of a particular individual in the context of the study domain. As a result, it is entirely likely that a study domain will include conversations where the "talker" for a particular conversation is an individual designated to be a "listener" for the study domain and/or where the "listener" for a particular conversation is an individual designated to be a "talker" for the study domain.

Consequently, conversations within a study domain may include talker-listener conversations, where the roles for the individuals within such conversations are consistent with those defined for the overall domain, as well as talker-talker, listener-talker, and listener-listener conversations, where one or both of the participants in such conversations have roles within such conversations that are inconsistent with their designated roles in the study domain. As will become more apparent below, it may be desirable to exclude certain conversations, particularly those originated by listeners, from analysis in certain circumstances.

Precisely how an individual is designated as a talker or a listener can vary in different applications, and is discussed in greater detail below. It should also be appreciated that some electronic messages may be addressed to multiple recipients, whereby a particular message may be considered to represent multiple conversations between the same talker and different listeners. In the alternative, multiple listeners may be considered to be participating in the same conversation.

Conversations are typically harvested and derived from selected messages that pertain to a particular selection criterion, e.g., to analyze only messages dealing with a particular area or domain of interest. Thus, in many instances the conversations identified during communication assessment may represent only a subset of the messages capable of being accessed by a communication assessment system consistent with the invention.

From the conversations identified for a particular area of interest, communication "strengths" for various participants of those conversations may be derived, either in the form of relative or absolute strength values. Communication strength consistent with the invention may represent either or both of "talker" strength and "listener" strength, and may be dependent upon calculations made under differing conditions (e.g., using different wearout factors, as discussed in greater detail below). Talker strength generally represents an individual's propensity to communicate to others, while listener strength generally represents an individual's propensity to listen or otherwise be willing to receive information communicated by others. When used in connection with selecting connectors for use in viral marketing or other marketing endeavors, communication strength may also be representative of "connector" strength as well.

To determine communication strengths, identified conversations are used to determine the general levels of messaging activity between various talkers and listeners, typically in the form of activity indicators such as conversation counts. These activity indicators are then typically used to populate a matrix from which modeling may be performed to facilitate the quantitative assessment of communication strength.

A quantitative assessment of communication strength as used herein is based upon the fundamental underlying propositions that: (1) strong talkers are those who frequently talk to strong listeners; and (2) strong listeners are those who frequently listen to strong talkers. As will become more apparent below, these two propositions may be resolved through solution of an eigenvalue problem using quantitative modeling techniques. From such modeling techniques, one or both of talker and listener strength may be derived for selected individuals, and under varying input conditions.

As will become more apparent below, the end uses of calculated communication strengths may include, for example, the selection of "connectors", e.g., strong talkers (who are also possibly strong listeners), who are more likely to be able to effectively convey viral marketing messages, as well as have those messages listened to and given weight by other individuals, or who may be appropriate for use in market research projects. In other instances, listener strength may also be utilized separate from talker strength to identify individuals that are particularly receptive to particular messages or encounters.

The quantitative analysis techniques utilized to perform communication assessment consistent with the invention are presented in greater detail hereinafter. However, prior to such presentation, a brief discussion of an exemplary hardware and software environment suitable for implementing communication assessment consistent with the invention is provided.

Hardware and Software Environment

Turning now to the Drawings, wherein like numbers denote like parts throughout the several views, FIG. 1 illustrates an exemplary application of communication assessment, in particular within a viral marketing architecture or environment 10, in which is illustrated an exemplary set of individuals 12. Individuals 12 may be considered to exist within either or both of a "cyber" world 14 (i.e., as those individuals interact with other individuals over the Internet or another electronic medium) or physical world 16.

To implement a viral marketing architecture, an enterprise 18, e.g., a business, educational institution, non-profit organization, etc., that wishes to conduct viral marketing may utilize a communication assessment system 20 to harvest information about electronic communications between individuals 12, and from such information, to assess connection strengths of various individuals in connection with particular study parameters. In the illustrated embodiment, the harvested information takes the form of electronic messages 22.

As will become more apparent below, the harvested electronic messages are processed by communication assessment system 20 to generate communication strengths for various individuals so that one or more of such individuals may be selected from a pool of individuals based upon their respective communication strengths. For a viral marketing application, for example, it may be desirable to select individuals having relatively communication strengths (e.g., having relatively high talker strengths, and optionally, relatively high listener strengths as well) so that such individuals may be designated as "connectors" and targeted in a viral marketing campaign. In FIG. 1, for example, individuals 12 that meet a connector criterion are illustrated using cross-hatched representations.

For the purposes of viral marketing, it is anticipated that an individual 24 within enterprise 18, e.g., a maven and/or salesperson, will attempt to initiate a viral marketing encounter with one or more connectors, e.g., as represented by encounter 25 directed to a connector individual designated at 12A. Then, as shown in FIG. 1, it is anticipated that the designated connector 12A will relay the viral marketing message to other individuals 12 within either or both of the "cyber" and physical worlds 14, 16.

Any number of known viral marketing encounters may be utilized to initiate a viral marketing campaign. For example, electronic messages, printed letters, product samples, coupons, product and other "useful" information may be conveyed to an individual, and other contacts, such as telephone calls, may be initiated. An individual may be provided with an "opt-in" invitation, or the individual may be solicited for input, advice or interviews. A contact may acknowledge and/or celebrate an individual's expertise, knowledge and/or celebrity, and may invite an individual to participate in an event such as a focus group. Other contacts that create a favorable impression to the individual may also be initiated.

As another component of a viral marketing architecture, it may be desirable to utilize an additional measurement/feedback system 26 that receives feedback (designated at 28) from either or both of worlds 14, 16 for use in determining marketing efficacy. Various known forms of collecting and processing feedback, whether electronic, automated, or manual in nature, may be used to gauge the effectiveness of a particular marketing encounter and/or campaign. For example, emails capable of triggering a report back to a monitor may be used to detect viewings by connectors, as well as forwarding of the emails to additional recipients. Questionnaires and surveys may also be directed to connectors to gauge effectiveness.

Additional operations may be desirable in a viral marketing architecture. For example, it may be desirable to convert electronic identities into real identities. In many forums, for example, individuals are identified by email address or pseudonym, and it is often only these identifiers that will be available during data mining and analysis. Translation, e.g., via directory lookup, examination of message content, examination of user profiles, or working with a third-party host of a message archive may be used to derive a real identity to which encounters may be directed. In the alternative, an encounter may be directed to the electronic identity, e.g., by posting or sending a reply directed to a specific individual.

It also may be desirable to "screen" connectors to attempt to determine suitability of a connector for a particular marketing activity. For example, connectors may be offered surveys, or their messages may be analyzed manually or automatically to determine their usefulness.

It will be appreciated by one of ordinary skill in the art having the benefit of the instant disclosure that communication assessment consistent with the invention has applicability in a wide variety of other applications. For example, communication assessment may be used to identify individuals for market research projects, e.g., to select individuals for placement in a focus group, to select individuals from which to solicit input on product/service improvements, etc. Communication assessment may also be used to select individuals having high listener strengths, e.g., to identify individuals that might be more receptive to listening to a particular proposal, message or encounter.

Figure 2:
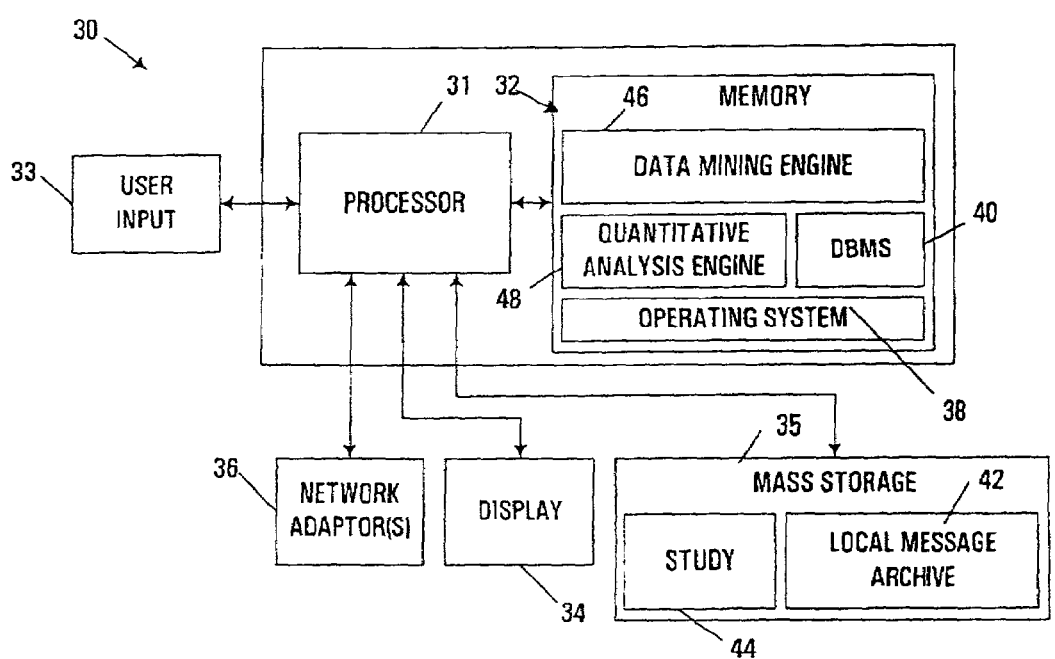
FIG. 2 is a block diagram of an apparatus suitable for implementing communication assessment in the viral marketing architecture of FIG. 1.

FIG. 2 next illustrates an exemplary hardware and software environment for an apparatus 30 suitable for implementing communication assessment consistent with the invention. For the purposes of the invention, apparatus 30 may represent practically any type of computer, computer system or other programmable electronic device, including a client computer, a desktop computer, a server computer, a portable computer, a handheld computer, an embedded controller, etc. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 35 or on another computer coupled to computer 30 via a network.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). Otherwise, user input may be received via another computer interfaced with computer 30, e.g., a workstation.

For additional storage, computer 30 may also include one or more mass storage devices 35, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks (e.g., a LAN, a WAN, a wireless network, and/or the Internet, among others) via one or more network adaptors 36 to permit the communication of information with other computers coupled to the network. It should be appreciated that computer 30 typically includes suitable analog and/or digital interfaces between processor 31 and each of components 32, 33, 34, 35 and 36 as is well known in the art.

Computer 30 operates under the control of an operating system 38, and executes or otherwise relies upon various computer software applications, components, programs, objects, modules, data structures, etc. (e.g., database management system (DBMS) 40, local message archive 42, study 44, data mining engine 46, and quantitative analysis engine 48, among others). Moreover, various applications, components, programs, objects, modules, etc. may also execute on one or more processors in another computer coupled to computer 30 via a network 36, e.g., in a distributed or client-server computing environment, whereby the processing required to implement the functions of a computer program may be allocated to multiple computers over a network. In particular, it is envisioned that the functions of harvesting messages, managing message archives and study data, and performing quantitative analysis, may be performed by different computers interfaced together over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. Furthermore, it will be appreciated that a "program" may actually incorporate program code executing on multiple computers, as well as program code that may be considered to be executing as multiple computer applications. Therefore, as an example, program code performing certain aspects of the illustrated embodiment within a quantitative analysis engine, as well as program code performing other aspects in a database management system and/or a data mining engine, may nonetheless still be considered to be one program within the context of the invention, irrespective of the fact that such program code may be executing in different applications and on different computers.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Communication Assessment Overview

FIG. 3 presents an overview of the principal steps utilized in an exemplary implementation of a communication assessment system consistent with the invention. In this exemplary implementation, public message archives (represented at 50) are harvested by data mining engine 46 of apparatus 30 (FIG. 2) in a harvest step 52, resulting in the population of local message archive 42 in database management system 40. In this implementation, the public message archive can represent practically any electronically-accessible message repository or collection of message repositories, e.g., news archives, forums, mailing list (listserv) servers, instant messaging archives, chat archives, telephone record archives, etc., and may be accessible via the Internet or another communication network.

Harvesting is generally used to pare down the available search space to focus on messages directed to a particular domain of interest, e.g., "water purification", or "teens' interest in electronic games." Harvesting typically incorporates identifying electronic message repositories that potentially contain messages relevant to the domain of interest. In the illustrated implementation, for example, specific news archives or forums that potentially pertain to a particular domain of interest are utilized as the principal search space from which harvesting occurs.

Harvesting may be performed in an automated fashion using any of a number of known harvesting techniques, e.g., using various commercially-available data mining engines such as Content Exchange available from Liason Technology. Typically, data records are harvested (retrieved and saved) from the search space and organized in the local message archive, optionally with the assistance of automated agents. The data harvested may contain as many of the fields describing a forum posting as are desired or available, e.g., date posted, time posted, author ID, message forum where posted, message text, thread ID, response message ID, etc. In addition or in lieu of any or all of these items, web links (URL's) to the forum posts may also be harvested.

A local archive may be maintained in any of a number of database architectures. For example, a local archive may be maintained in any of a number of commercially available database management systems, e.g., Microsoft Access, Microsoft SQL server, Oracle, etc.

Harvesting to a local archive is often desirable for performance reasons, given that harvesting can be substantially automated, and that access from a local archive during selection and model building is often more reliable and faster than accessing directly from public archives. Moreover, segregating harvesting and study selection permits study variations to be reframed relatively easily to reformulate results to account for different input parameters. In the alternative, however, a local message archive may not be used and/or harvesting may not performed in some instances.

Next, a select step 54 is typically performed to further reduce the search space from which relevant electronic messages are obtained, and to create therefrom the framework for a study 44. Within this selection process, keywords may be selected to narrow the topic of interest further, as well as to limit messages to certain date ranges, forums, etc., and to select out certain exceptional data if necessary. Moreover, it is also during selection that various study parameters are selected, including parameters for use in quantitative analysis, as well as definitional parameters such as what is a conversation, who is a talker and who is a listener. Furthermore, individual individuals, forums, threads, etc., may also be excluded from a study (e.g., if a certain individual or forum is known to have little relevance to a particular study).

The definitional parameters such as what is a conversation (a conversation criterion), who is a talker (a talker criterion) and who is a listener (a listener criterion) will typically vary in different applications, and may be selectable and controllable to vary study results within a particular application.

A conversation, in terms of written communications, may be defined even in the case of one-way messages such as e-mails. In the illustrated implementation, a conversation includes a message, an author who created the message, and a recipient (who is believed to have read the message). Typically, a conversation is considered to be between two individuals, so that a message sent to multiple individuals will constitute multiple conversations between the same author and each of the recipients.

Conversations need not require proof that an intended recipient actually read a message. Depending upon the "tightness" of the definition, a conversation may require that a recipient reply to or forward a message to confirm receipt of a message, or have posted a message in the same thread. Otherwise, simple membership on a distribution list, or membership in a forum, may be sufficient to identify a recipient of a message posted to the list or forum.

With other types of messages, e.g., real-time messages such as chats or instant messages, conversations may be defined by looking at archives of transcripts, and may require additional analysis to detect who was listening whenever a particular individual sent a message, e.g., based upon who replied directly to a statement, or even who was logged on at the time.

As with conversations, typically some form of restricted definition of a "talker" and a "listener" is desired, so that only a desirable subset of individuals represented in a message archive may be used. Typically, with written communications, a "talker" can be defined as the author of a message, or only the author of a particular type of message (e.g., the poster of the first message in a thread). Moreover, a talker may be required to have some posting activity above a certain threshold (e.g., more than two posts).

Listeners may simply be selected from the remaining individuals represented in an archive, or may be further restricted, e.g., to those that participated in one or more forums with a certain degree of activity beyond simple membership. Listeners, for example, may be required to have responded to a message or participated in a thread.

FIGS. 4 and 5, for example, illustrate different manners of defining talker and listener criteria in the exemplary implementation within the context of forum archives. As shown in each figure, a search space may include a plurality of forums 80, each of which including a plurality of posts 82 representing the electronic messages being analyzed. Certain posts 82 may be organized into threads (e.g., thread 84) whereby a chain of posts is defined with later posts in the chain consisting of replies to the original post or other earlier posts in the chain (in some archives, tree-like structures may also be defined to represent sub-threads that depart when a post is in reply to an intermediate post in the thread).

Individuals that author posts within the various forums 80 may be classified as talkers and/or listeners using various criteria. For example, FIG. 4 illustrates a relatively restrictive definition, where a talker is an author of a first, or initial, post in a thread. A listener in a restrictive definition, however, might only be those individuals who can be confirmed to have read an author's post. In FIG. 4, for example, listeners may be restricted to those who post replies to a particular post, or participate in a particular thread. Thus, in this example, an individual 86 who initiates thread 82 may be designated a talker, while the individuals who reply to the initial post (designated at 88 and 90) may be designated listeners. In this example, therefore, two conversations are defined: one between individuals 86 and 88, and one between individuals 86 and 90.

A comparatively looser set of criteria would be to distinguish talkers and listeners by virtue of the number of posts made by individuals to the search space. Thus, for example, as shown in FIG. 5, if individuals 86 and 88 only posted once each to a particular set of forums, and individual 90 posted above a certain threshold (e.g., 3 posts or more), individuals 86 and 88 could be designated as listeners, and individual 90 designated as a talker.

Other manners of designating talkers and/or listeners may be used consistent with the invention. For example, listeners could be designated by virtue of merely participating in a thread, specifically replying to a particular post, or just via membership in a forum. Moreover, in some instances it may be desirable to incorporate multiple factors, as well as scale such factors to effectively assign different weights to different types of activities. Also, for certain individuals within a domain of interest that do not meet minimum thresholds for talking and/or listening, such individuals may be excluded from analysis entirely.

Returning to FIG. 3, selection of messages from archive 42, as well as the input of study parameters into study 44, may be performed in select step 54 in a number of manners. For example, one versed in SQL or other database languages may build a study 44 through the generation of appropriate database statements and instructions. In the alternative, a user interface, e.g., a graphical user interface, may be used to permit a user lacking specific knowledge of database languages to perform similar operations.

In addition to conversation, talker and listener criteria, a study may also specify a particular study domain, representing the narrowing of the harvest domain by a desired selection criterion. A study domain may be constrained, for example, by dates, forums, keywords/content, ad hoc corrections/exclusions (e.g., irrelevant individuals or forums), etc. Moreover, affective elements, e.g., representing the strength of the language used in messages, the presence of certain types of persuasive words, usages of particular semantic structures, etc., may also be considered, as may be the overall tone of messages (e.g., positive or negative).

Typically, a study 44, once selected, will include a database of "conversations", with each identifying, in the least, an author and a recipient. In selection of the study, the conversation database may also be processed and organized to generate a conversation table that identifies in each entry an author, a recipient, and a conversation count, optionally weighted, representing the number of conversations found between the associated author and recipient.

From this study, quantitative analysis engine 48 is initiated to perform a build model step 56 to generate a mathematical model that expresses the dual propositions of strong talkers talking frequently to strong listeners, and strong listeners listening frequently to strong talkers.

This solution to these propositions is a circular definition that requires a mathematical solution, which in this implementation takes the form of an eigenvalue problem. Solution of the mathematical problem is thus performed in a solve step 58, also performed by quantitative analysis engine 48. The results, including relative strength values for talking and/or listening activities of the individuals in the study, are returned to the study 44. In addition, one or more plots or other charts, figures, etc., may also be generated by engine 48 and/or stored in the study, should such capability be provided by engine 48.

In the illustrated implementation, quantitative analysis engine 48 is implemented using MatLab 6, which is available from The Mathworks, Inc. of Natick, Mass. Other technical computing tools may be used in the alternative.

As also shown in FIG. 3, once a study has been completed, results are typically provided to a user via a report step 60, which may include any desired presentation of results, including text, tables, figures, graphs, charts, plots, etc. As will become more apparent below, any number of suitable user interfaces may be used to present the results to the user.

Figure 6A:
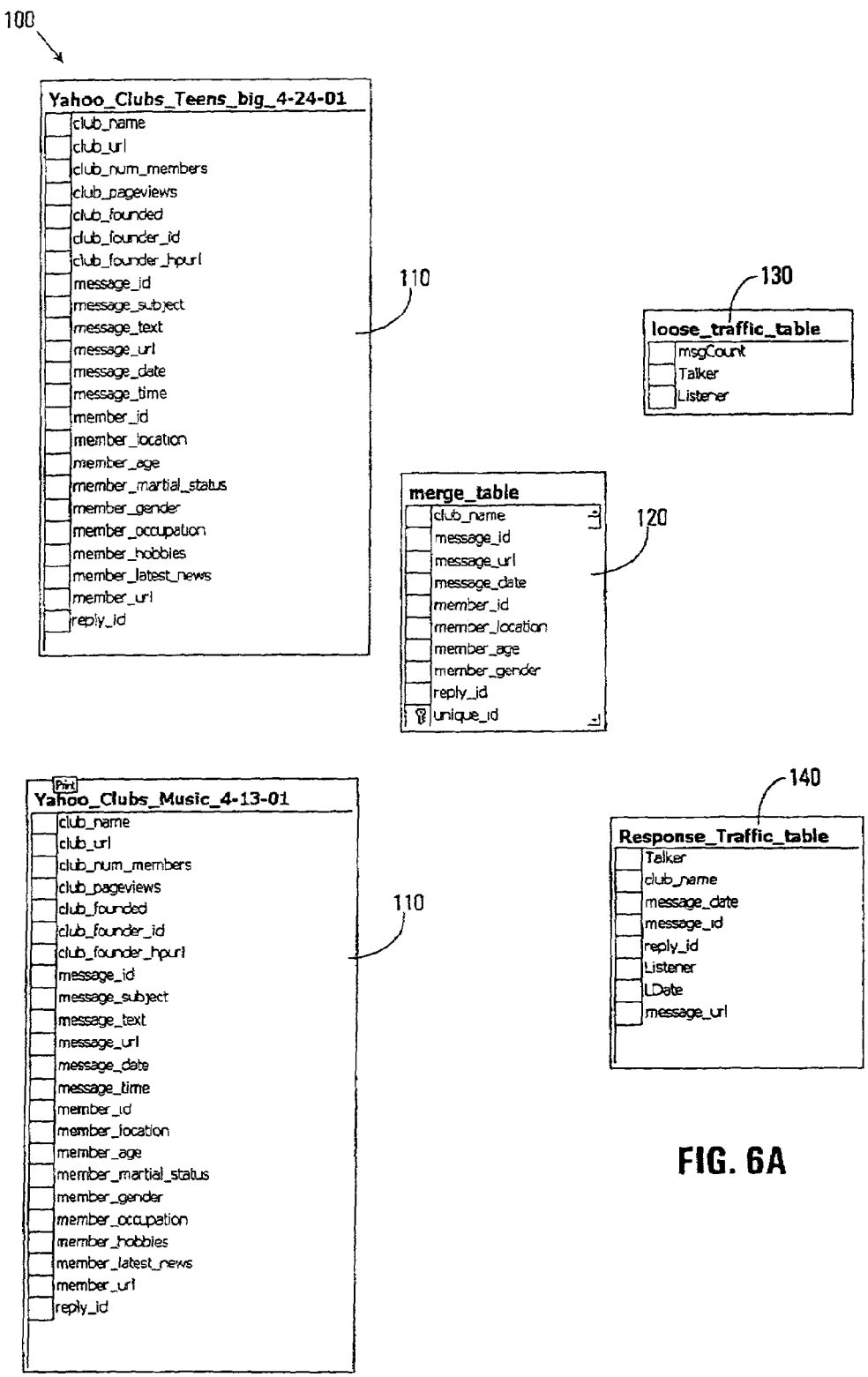
FIGS. 6A and 6B are object diagrams illustrating a database schema for an exemplary conversation archive from the apparatus of FIG. 2.
Figure 6B:
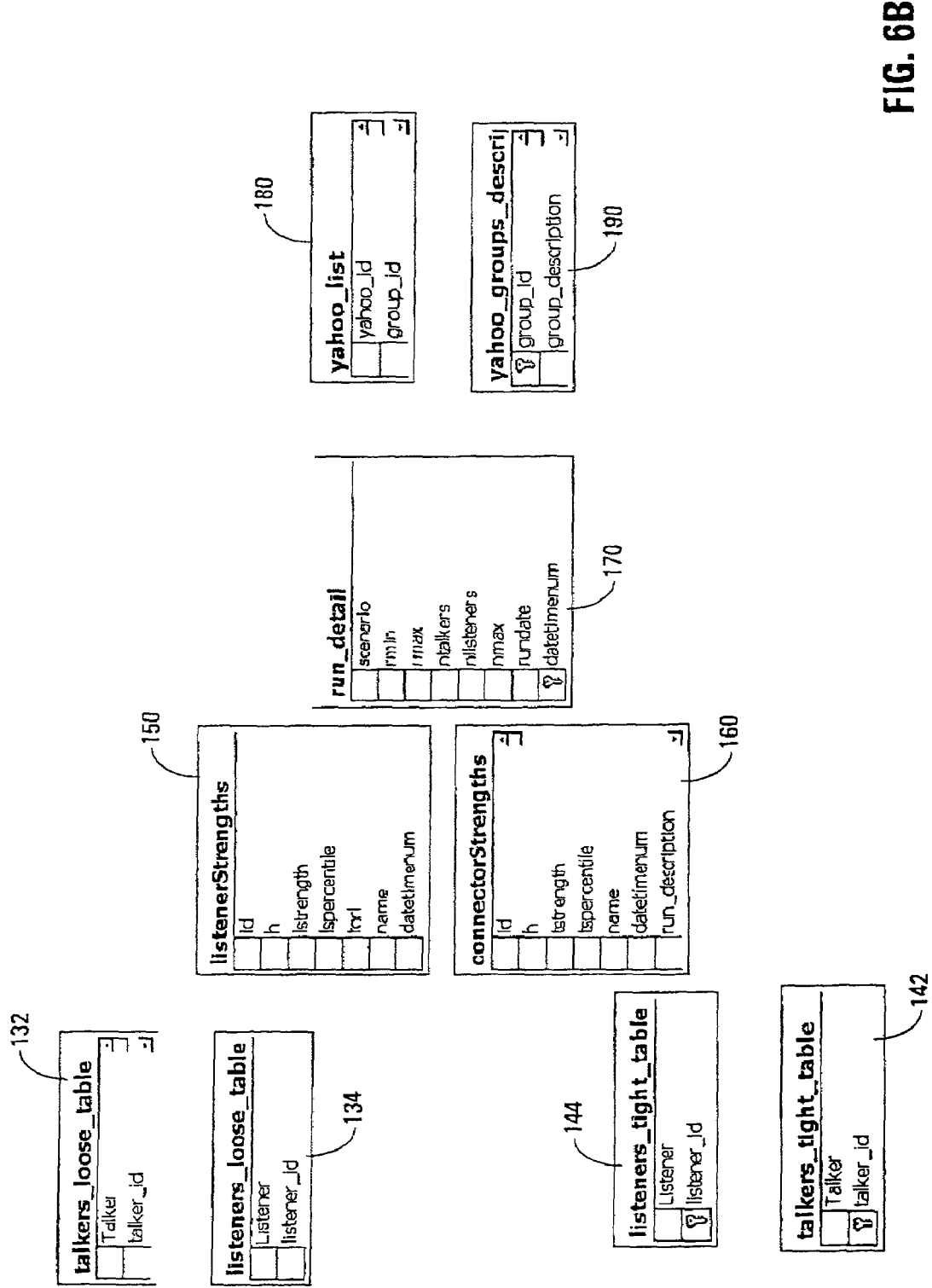

FIGS. 6A and 6B next illustrate an exemplary database schema for representing the electronic messages and individuals within a local message archive consistent with the invention. Tables 110 include data from the harvesting operation, and comprise the local message archive 42 of FIG. 2. Other tables in the diagram may be created by scripts, as described below, or may be generated in other manners known in the art. Table 120 collects data from tables 110 and screens them for study criteria, including date ranges, for example. Table 130 constitutes a study (item 44 in FIG. 2), based on a loose definition of a conversation. Table 132 extracts all the unique talkers from table 130. Table 134 extracts all the unique listeners from table 130. In a similar fashion, table 140 constitutes another study, this one based on a tight definition of a conversation. Table 142 extracts the unique talkers from table 140, and table 144 extracts the unique listeners from table 140.

Typically, when quantitative analysis engine 48 of FIG. 3 is executed, it reads a study. For example, it may read tables 130, 132, and 134. After building the model and solving the problem it will typically write data to table 150, recording the listening strengths of listeners, and to table 160 recording the talking strengths of talkers. It will typically also write data to table 170, recording details of the analysis such as the date and time of the run, and the values used for the wearout factors. Tables 180 and 190 may provide any custom reporting from the results data in any of the other tables in FIGS. 6A and 6B.

As mentioned above, scripts may be used to create, modify, or delete tables in database 40 of FIG. 3. An exemplary script as shown below in Table I:

TABLE I

Exemplary SQL Script

```
DROP TABLE [Response_Traffic_table]
GO
CREATE TABLE [Response_Traffic_table] (
[Talker] [varchar] (50)
COLLATE SQL_Latin1_General_CP1_CI_AS NOT NULL,
[club_name] [varchar] (100)
COLLATE SQL_Latin1_General_CPI_CI_AS NULL,
[message_date] [datetime]NULL,
[message_id] [int]NOT NULL,
[reply_id] [int]NULL,
[Listener] [varchar](50)
COLLATE SQL_Latin1_General_CP1_CI_AS NOT NULL,
[LDate] [datetime]NULL,
[message_url] [varchar](200)
COLLATE SQL_Latin1_General_CP1_CI_AS NOT NULL
) ON [PRIMARY]
GO
INSERT INTO [Response_Traffic_table]
SELECT DISTINCT
TOP 100 PERCENT dbo.merge_table.member_id AS Talker,
dbo.merge_table.club_name, dbo.merge_table.message_date,
dbo.merge_table.message_id, dbo.merge table.reply_id,
merge_table_1.member_id AS Listener,
merge_table_1.message_date AS LDate,
dbo.merge_table.message_url
FROM dbo.merge_table INNER JOIN dbo.merge_table merge_table_1
dbo.merge_table.reply_id = merge_table_1.message_id AND
dbo.merge_table.club_name = merge_table_1.club_name
WHERE (dbo.merge_table.message_id IS NOT NULL) AND
(dbo.merge_table.message_date >
CONVERT(DATETIME, '2000-10-10 00:00:00', 102)) AND
(dbo.merge_table.message_date < CONVERT(DATETIME,
'2001-04-10 00:00:00', 102))
AND (dbo.merge_table.member_id IS NOT NULL)
ORDER BY dbo.merge_table.member_id
GO
```

The above exemplary script deletes an existing table such as table 140 in FIG. 6A, and recreates a new, empty table in its place. It then merges data such as the data in tables 110 in FIG. 6A, selects records within a date range, and stores the results in the new table. As one skilled in the art will readily appreciate, sequences of structured query language statements like those shown can be written and invoked by the user whenever desired. Alternatively such scripts may be scheduled to automatically execute by other means provided by the database management system software.

It should also be appreciated that the actual messages may be collected within an archive, or that links to such messages may be collected so that a user can retrieve the messages from the original, public archive, when reviewing the results.

Quantitative Analysis

Figure 7:
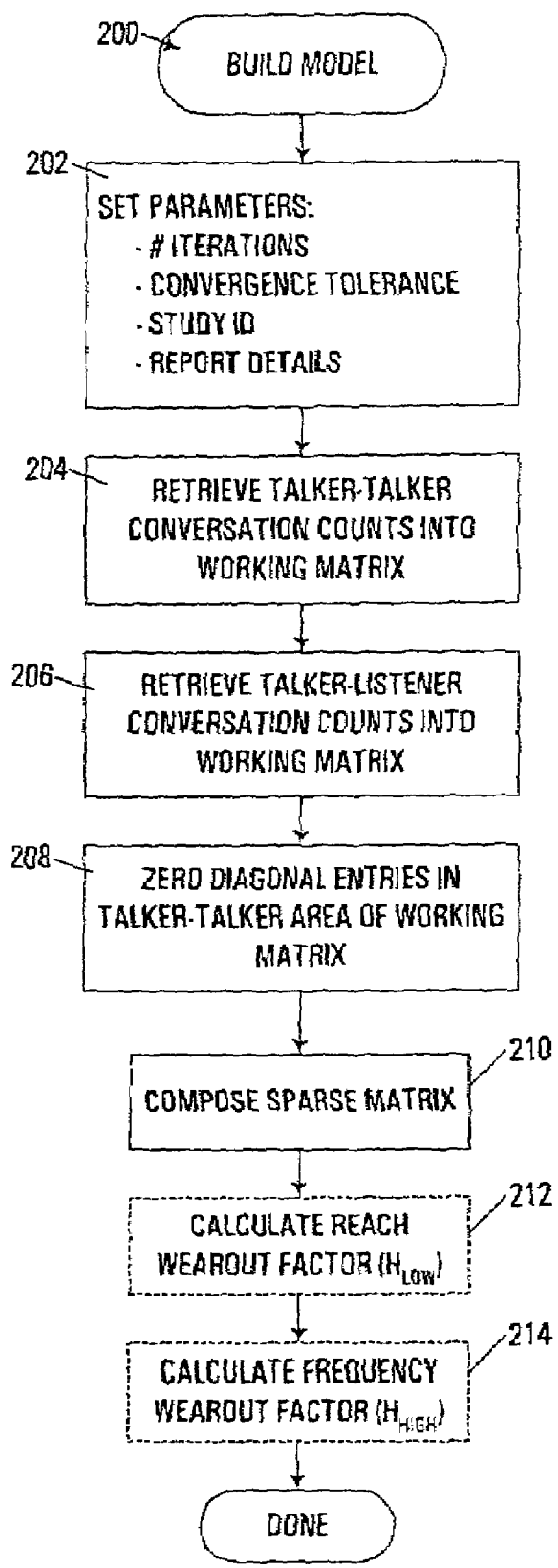
FIG. 7 illustrates the program flow of an exemplary routine for implementing the build model step of FIG. 3.
Figure 8:
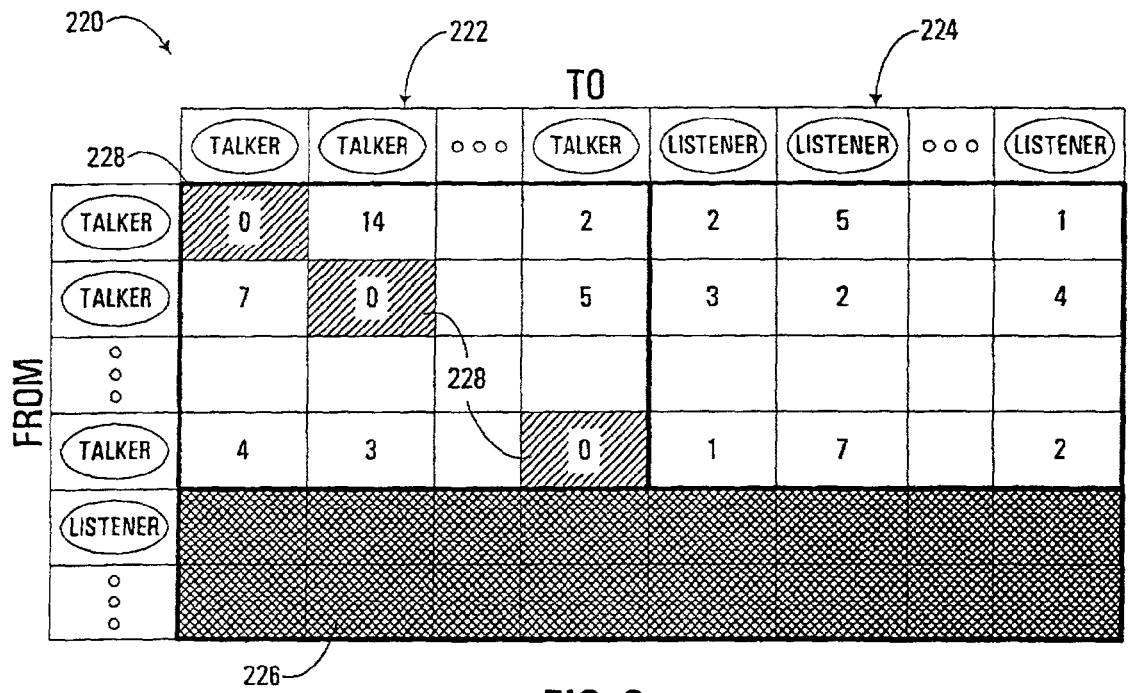
FIG. 8 is a block diagram of an exemplary working matrix generated by the routine of FIG. 7.
Figure 9:
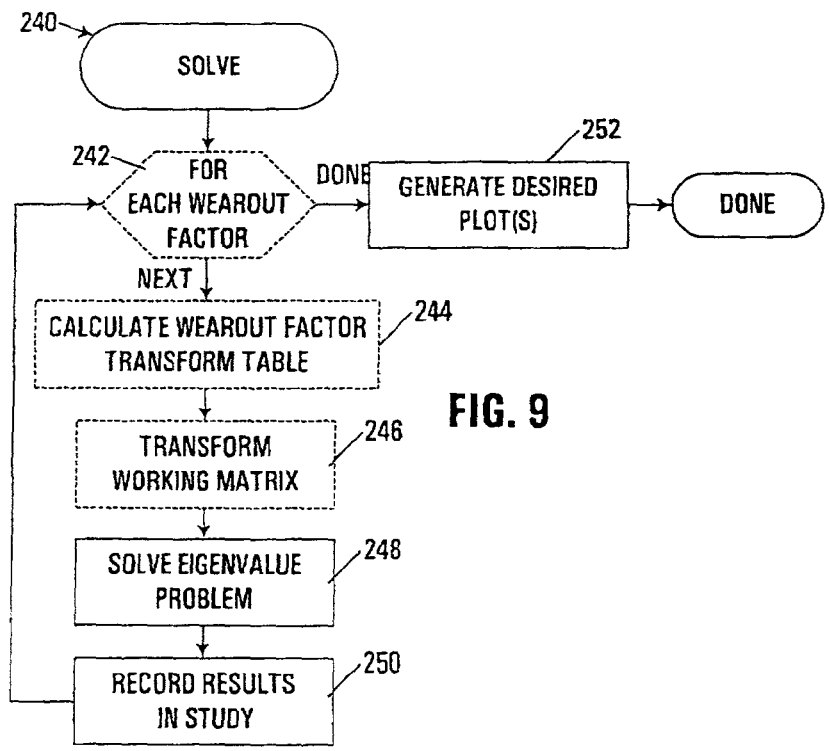
FIG. 9 illustrates the program flow of an exemplary routine for implementing the solve step of FIG. 3.

FIGS. 7–9 illustrate in greater detail the quantitative analysis operations utilized in the illustrated implementation to derive results from a study consistent with the invention. By way of background, however, the mathematical bases behind the operations performed during quantitative analysis are first explained hereinafter, assuming a message archive based upon forums (discussion groups).

In particular, let D be a domain of interest, including
a set of forums (discussion groups),
a set of users (individuals), and
a set of discussion threads.
Then, within D let
$U_i$ be user i
$F_j$ be forum j
$T_{jk}$ be thread k in $F_j$
$W_{ijk}^t$=talk activity for $U_i$ with respect to $T_{jk}$
$W_{ijk}^l$=listen activity for $U_i$ with respect to $T_{jk}$ Various talk and listen activities may be considered based upon the various manners in which talkers, listeners, and conversations are defined within appropriate criteria.

For example, for talk activity, $W_{ijk}^t$ may be defined in a number of manners, including (among others):

$W_{ijk}^t$=1 if $U_i$ submitted a message to $T_{jk}$, 0 otherwise   (1a)

or $W_{ijk}^t$=1 if $U_i$ submitted initial message of $T_{jk}$, 0 otherwise   (1b)

or $W_{ijk}^t$=percentage of messages in $T_{jk}$ submitted by $U_i$   (1c)

or $W_{ijk}^t$=number of messages in $T_{jk}$ submitted by $U_i$   (1d)

Likewise, for listen activity, $W_{ijk}^l$ may be defined in a number of manners, including (among others):

$W_{ijk}^l$=1 if $U_i$ is a member of $F_j$, 0 otherwise   (2a)

or $W_{ijk}^l$=1 if $U_i$ submitted a message in $T_{jk}$, 0 otherwise   (2b)

or $W_{ijk}^l$=percentage of messages in $T_{jk}$ submitted by $U_i$   (2c)

or $W_{ijk}^l$=number of messages in $T_{jk}$ submitted by $U_i$   (2d)

Next, consider the directed graph G where each node corresponds to a user and the edge weight from node r to node s is given by $$w_{rs} = \sum_{j,k} w_{rjk}^t w_{sjk}^l \quad (3)$$

These edge weights represent the level of messaging activity from User r to User s, under the conditions adopted in equations (1) and (2). In one embodiment, for example, each value $W_{rs}$ may represent a "conversation count" between users r and s. In other embodiments, some other value (referred to as an activity indicator) that represents the level of activity directed from user r to user s may be used.

For example, activity indicators such as normalized conversation counts, rate of conversations (number per unit of time), regularity of conversations (variance of time between messages), average length of text in messages, etc., may be used.

At this point, the values $W_{rs}$ can be transformed based upon wearout factor, which is discussed in greater detail below. However, to minimize confusion with the overall algorithm, non-transformed $W_{rs}$ values will initially be considered.

As discussed above, the determination of communication strength for individuals is based upon the dual propositions that a good talker is one who talks frequently to good listeners, and that a good listener is one who listens frequently to good talkers. Thus, considering these propositions, the following relationships can be defined:

W=matrix of values $W_{rs}$ representing messaging activity
u=vector of overall talking strength, such that $u_i$ is for user $U_i$
v=vector of overall listening strength, such that $v_i$ is for user $U_i$ Then v=Wu $u=W^T v$ (4)

which provides the eigenvalue problem:

$u=W^T W u$ (5)

It has been determined, however, that this equation need not be solved precisely, since the objective is only to find the subset of strong talkers and listeners (not their precise strength values). Hence, an approximation algorithm can be used:

Make an initial estimate u=1 (6)

and iteratively apply equation (4) until the values of u and v stabilize. For example, at each iteration, the root mean square of change in either/both vectors can be checked against a tolerance for stopping. Also, at each iteration, the u vector may be revised to a weighted average of an incumbent value and a new value, such as:

$u^{new}=(1-\alpha)u^{old}+\alpha W^T v$ (7)

The convergence criterion can be represented as $$\frac{\|u^{new}-u^{old}\|}{\sqrt{dim(u)}} \le \varepsilon \quad (7a)$$

Typically, in the computational implementation, the vector u is normalized at every iteration, but the vector v is not. Alternatively, one may start with v=1 and iteratively revise the v vector in a complementary fashion to that described herein for the u vector.

Thus, from the above equations, one may let

T be the subset of users such that $u_j$ is large (e.g. top x %), and

L be the subset of users such that $v_j$ is large (e.g. top x %)

Therefore, each user in T may be considered to be a strong talker in D since he or she talks to a large number of strong listeners. Likewise, each user in L may be considered to be a strong listener in D since he or she listens to strong talkers. Furthermore, the best connectors may be selected from those individuals having the highest talking strengths, and possibly also having the highest listening strengths as well (e.g., a higher listening strength may be used to favor one individual having the same talking strength as another individual).

In addition, in cooperation with the above solution to an eigenvalue problem, an additional concept of "wearout" may be factored into resolving communication strengths. In particular, it is known that in advertising, diminishing returns are obtained through repeated viewings of an advertisement. Similarly, while the more times a talker sends a message to a particular listener indicates greater talking strength, the incremental strength may diminish for greater numbers of messages to the same listener.

It has been found that a progressive decline in the strength value of every additional message between a talker and a listener can be modeled as follows. Assume that the strength value of an initial message is 1 and that each successive message has value reduced by a constant factor p. Then the strength value of the $n^{th}$ message is $f(n)=p^{n-1}$ (8)

and the cumulative strength of n messages is $$F(n) = 1 + p + p^2 + \ldots + p^{n-1} \quad (9)$$

or $$F(n) = \frac{(1-p^n)}{1-p}$$

To recast this in more intuitive terms, one can ask "How many additional messages after the first will it take to drop the value by one half?" Suppose this number is h. Then $f(h)=p^{h-1}=0.5$ so $$p = e^{\left(\frac{\ln(0.5)}{h-1}\right)} \quad (10)$$

While this analysis is not precisely the same as analyzing the effectiveness of a talker sending the same message over and over again (as in a repeated advertisement exposure), this analysis is not attempting to measure the effectiveness of the content of any individual message at all. The analysis is for the purpose of assessing the strength of communication, so every message sent is an exemplar of that activity.

As a consequence, for any given value of the half-life h, the matrix W can be transformed by $W'=F(W)$ (11)

such that $w'_{ij}=F(w_{ij})$

Therefore, by transforming matrix W prior to solving the eigenvalue problem, the diminishing returns of repeated messages may be factored into the determinations of relative communication strengths. The half-life h represents one implementation of a "wearout factor", which is used to mathematically represent the diminishing effect of messages. It will be appreciated that other forms of wearout factors may be used to transform conversation counts consistent with the invention.

By incorporating a wearout factor into analysis, contrasts may be highlighted between "reach" and "frequency" value systems. "Reach" refers generally to the relative number of recipients of a message, while "frequency" refers generally to the number of messages. Thus, an individual that sends many messages to only a few other individuals will generally be favored higher in a "frequency" value system than in a "reach" value system, while the converse is true for one that sends relatively few messages but to large numbers of recipients.

As a result, it may be desirable to perform the above-described analysis for multiple wearout factors, and thus detect the contrasts between individuals in different value systems. Consider, for example, the selection of two wearout factor values:

$h_{low}$, which represents fast wearout, and rewards reach, and $h_{high}$, which represents slow wearout, and rewards frequency.

By comparing the results of analysis using the different wearout factors, potentially useful choices may be made after seeing the results, e.g., choices about which connectors to include in a marketing plan, or in a comparative study. It is believed that selection of the wearout factors for good "contrast" will vary for different studies and applications, since effective values depend on the maximum message frequency in the W matrix. Equation (9) gives the transformed value of message frequency, and effectively attenuates the original frequency by the factor $$g(n) = \frac{F(n)}{n}.$$

This factor is strictly decreasing in n, so it can have its maximum effect on the maximum message frequency, i.e., where $w_{max} = \max(w_{ij})$.

To provide appropriate contrast in a study, $h_{low}$ typically should be selected to be large enough that $g(w_{max})$ doesn't "vanish." Further, $h_{high}$ maybe chosen arbitrarily high (representing "no wearout"), or to assure some nominal wearout level $\theta_u$. To quantify the notion of "vanishing" and "nominal" one can choose parameters $\theta_l$ and $\theta_u$, representing upper and lower attenuations (for the maximum message frequency). One may use integer values for simplicity, resulting in selections of wearout factors as:

$$h_{low} = \text{minh} \left| \frac{F(w_{max})}{w_{max}} \geq \theta_l \right. \quad (12)$$

and $$h_{high} = \text{maxh} \left| \frac{F(w_{max})}{w_{max}} \leq \theta_u \right. \quad (13)$$

Now turning to FIG. 7, an exemplary implementation of the build model step 56 (FIG. 3) is implemented in quantitative analysis engine 48, specifically in the form of a build model routine 200. As shown in the figure, routine 200 begins in block 202 by setting the parameters for use in building the model, including the number of iterations for the approximation algorithm used to solve the eigenvalue problem (the iteration limit), the convergence tolerance ($\epsilon$, used in equation (7a)), a study identifier, and details regarding the desired report values and plots to be generated by engine 48 (plots and reports may be generated by either of engine 48 or DBMS 40 depending upon the relative capabilities of each). Additional variables, e.g., the averaging factor ($\alpha$, used in equation (7)) and the upper and lower attenuations ($\theta_l$ and $\theta_u$, used in equations (12) and (13)) may also be specified in the study. Any of the above variables may also be fixed and unalterable by a user.

While other values may be used, one suitable set of values includes $\alpha=0.15$, $\theta_l=0.05$, $\theta_u=0.95$, $\epsilon=0.05$, and iteration limit=250.

Next, in block 204, talker-talker conversation counts are retrieved into a working matrix. In particular, the conversation table stored in the study is accessed to retrieve into a talker-talker area of a working matrix the conversation counts between individuals defined to be "talkers" in the study, i.e., those individuals that meet the defined talker criterion. Since any given individual may both receive and send messages, it will be appreciated that two different conversation counts will typically be associated with any given pair of individuals, one reflecting conversations where the first individual is the author and the second is the recipient, and one reflecting conversations where the first is the recipient and the second is the author.

Next, in block 206, talker-listener conversation counts are retrieved into the same working matrix, this time to store the conversation counts from the same set of talkers to other individuals that meet the listener criterion. Thereafter, in block 208, the diagonal entries in the talker-talker area of the working matrix are nulled (zeroed out) given that any non-zero diagonal entries represent conversations where the same individual is both author and recipient for a conversation under a given conversation criterion (e.g., which might occur if a listener of a message is considered to be any member of a forum, and where the author of the message is a member of the forum), which is not generally useful information for a study of this type.

In some embodiments, it may be desirable to store listener-talker and/or listener-listener conversation counts. However, in the illustrated implementation, these counts are omitted from consideration.

FIG. 8, for example, illustrates an exemplary working matrix 220 capable of being generated by the operations described above in connection with blocks 208. The authors of conversations are arranged in the rows of the matrix, while the recipients are arranged in the columns of the matrix. Each entry in the matrix then stores a conversation count for a given pair of author and recipient. As shown in FIG. 8, talker-talker and talker-listener areas 222, 224 are defined, representing the areas in which the author is a talker, and the recipient is respectively a talker or listener). Listener-talker and listener-listener areas of the matrix (collectively represented at 226) are either not used, and nulled out, or are simply omitted from the dimensions of the matrix. Moreover, as shown by entries 228, the diagonal entries in the talker-talker area 222 are nulled out by virtue of block 208 (FIG. 7).

Returning to FIG. 7, once the working matrix is populated as described above, a "sparse" matrix is typically generated in block 210, which assists in minimizing the calculation overhead for engine 48, and thus improving performance. The use and generation of sparse matrices are well known in the art.

Next, in blocks 212 and 214, reach and frequency wearout factors are optionally calculated as described above, and routine 200 is complete. Where wearout factors are not used, blocks 212 and 214 are omitted.

Now turning to FIG. 9, a solve routine 240 is illustrated for implementing solve step 58 (FIG. 3). In this routine, multiple cycles may be performed depending upon the number of wearout factors specified, as represented by FOR loop block 242. For each such wearout factor, control passes to block 244 to calculate a wearout factor transform table, which may be implemented, for example, as a lookup table with an entry for each conversation count between one and the maximum conversation count seen in the working matrix. For each entry in the lookup table, the associated conversation count is scaled using equation (9) above and stored in the entry.

Next, in block 246 the working matrix is transformed using the transform table, essentially by replacing every conversation count in the working matrix by the scaled value stored in the transform table entry for that conversation count.

In other embodiments, no transform table may be used, whereby the calculation representing equation (9) may be performed for each matrix entry, typically with lower performance. Also, where wearout factors are not used, blocks 242, 244 and 246 would not be performed.

Next, in block 248, the eigenvalue problem discussed above is solved by the quantitative analysis engine, generally by using the aforementioned parameters set in block 202 of FIG. 7, choosing an initial value for u of all one's, normalizing u, calculating v (equation (4) above), calculating a revised value for u (equation (7) above), comparing the change in u to $\epsilon$ (equation (7a) above), and repeating until either the change falls below the convergence criterion or the iteration limit has been reached.

Next, in block 250, the results (represented by the vectors u and v) are stored back into the study 44, and control returns to block 242 to process the working matrix using additional wearout factors. Once all wearout factors have been processed, control then passes to block 252 to generate any reports, plots, graphs, etc., desired from the quantitative analysis engine. Routine 240 is then complete. Alternatively, reports and graphs may be generated after solution for each wearout factor.

Reporting

Based upon the study results, various reports, plots, graphs, and the like may be generated. For example, reports regarding comparative communication strengths (i.e., talking strengths, listening strengths, or composite values representing combined talking and listening strengths) may be generated, with strengths indexed to a maximum value, represented as percentiles, etc. Talkers/listeners can be listed by forum, and links can be provided within reports to particular forums, user profiles, threads, posts, etc. The links may be made to the local and/or public message archives, as well as to other sources of author (individual) information such as home pages, user profile documents, directory listings, search query results, etc. Moreover, various graphs representing communication strengths may be generated and presented to a user.

Furthermore, while in the analysis described above, individuals are processed and reported separate from one another, in some applications where a large set of individuals exist in a study, it may be desirable in such applications to group together individuals having similar or identical messaging activities. For instance, suppose both Mary and Tom each send exactly 2 messages to the pets.cats forum and 1 message to the babysitters.advice forum, and no other messages. So, with respect to their "talker strength" they are indistinguishable. As a result, that pattern of messaging may be considered to define a particular "Talker Profile." It is a group, and Tom and Mary are in it, as is anyone else with that identical talking pattern. Mathematically, these profiles represent a set of equivalence classes, with each talker falling into exactly one class. Likewise, listeners can be grouped into Listener Profiles in a similar manner.

By grouping individuals into profiles, additional report data and graphs may be generated, as will become more apparent below.

Figure 10:
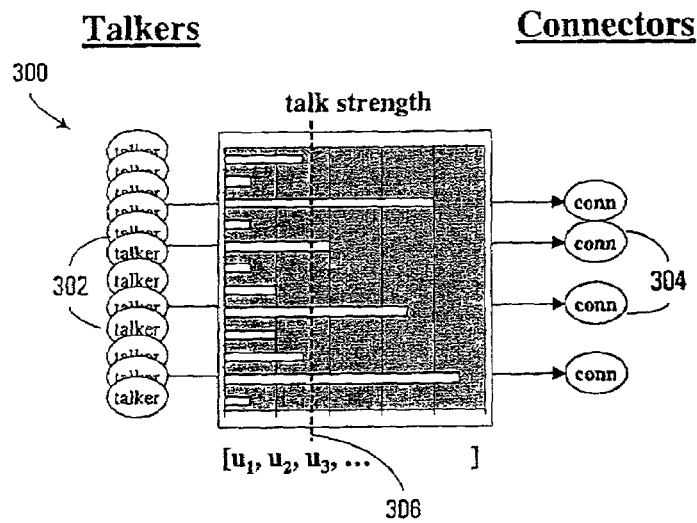
FIG. 10 is an exemplary talker strength diagram capable of being generated by the routine of FIG. 9.

FIG. 10, for example, illustrates an exemplary talker strength diagram capable of being generated by a quantitative analysis engine to display the relative talking strength of various talkers 302 in a horizontal bar chart form. In addition, in such a diagram, it may be desirable to automatically select and identify which of such talkers 302 are to be designated as connectors 304. For example, a threshold (represented by vertical line 306) may be used to select a subset of the talkers for designation as connectors. In the alternative, a predetermined percentage of talkers may be designated as connectors; e.g., by selecting the top x % of all talkers based upon talking strength. It should be appreciated that similar diagrams may be generated for listening strength, as well as composite communication strengths that incorporate both talking and listening strength.

Figure 11:
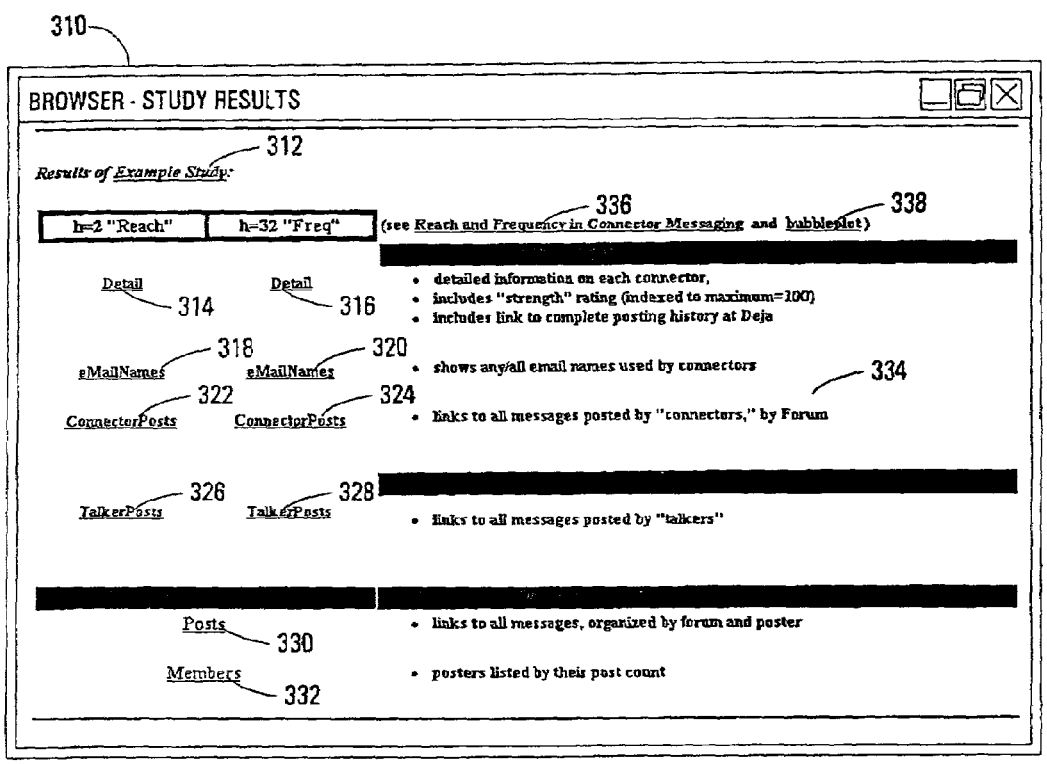
FIG. 11 is a block diagram of an exemplary study results display utilized in the report step of FIG. 3.

It will also be appreciated that various user interfaces may be utilized to present result information to a user. FIG. 11, for example, illustrates an exemplary HTML-compatible browser 310 from which study results may be presented to a user. In this implementation, results are displayed to a user via HTML-compatible documents containing hypertext links to various report pages, charts, and further information about a particular study. Such documents may be generated by a database management system, by a quantitative analysis engine, or by a separate application interfaced therewith.

A study results document, for example, may include a link 312 to another document that identifies the study parameters, so that a user can view the conditions under which a study was conducted.

Moreover, while a wide variety of alternate display formats may be used, FIG. 11 illustrates a format in which various reporting options are presented in multiple columns, one for each wearout factor scenario utilized in computing study results. In this instance, wearout factors, represented by half-life values of 2 and 32, are used to present results based upon reach valued and frequency valued scenarios. Links 314 and 316 provide more detailed information on each individual identified as a connector in each scenario, typically including a strength rating and links to the various messages posted by such connectors.

Links 318 and 320 provide the mapping of e-mail names or addresses for any connectors, including pseudonyms and optionally any identification information obtained for the connectors. Links 322 and 324 permit a user to retrieve links to the various messages posted by such connectors, often arranged by forum or other organization. Links 326 and 328 provide access to all the messages posted by all talker individuals, including connectors and non-connectors.

Link 330 provides access to all messages in the study, in the local or public messaging archives organized by forum and poster, while link 332 provides access to the various posters that authored messages in the archives. In addition, members may be associated with post counts representing the number of messages posted by those members.

Figure 12:
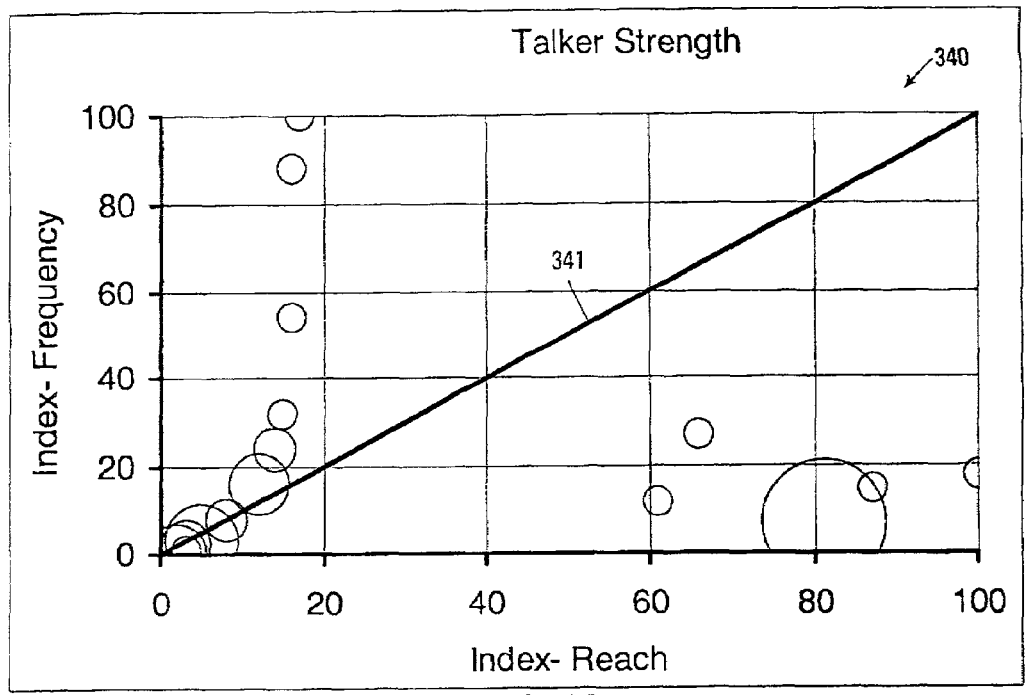
FIG. 12 is an exemplary bubble diagram capable of being generated by the routine of FIG. 9.

Additional information, e.g., the descriptive information shown at 334, may also be presented to a user. Moreover, via additional links such as link 336, additional features regarding concepts represented in a result, including a tutorial or overview on the various concepts utilized in the study, may be provided in separate documents. Moreover, links such as link 338 may be provided for access to various plots and graphs generated in connection with the study (here, a bubbleplot diagram such as shown in FIG. 12).

Figure 13:
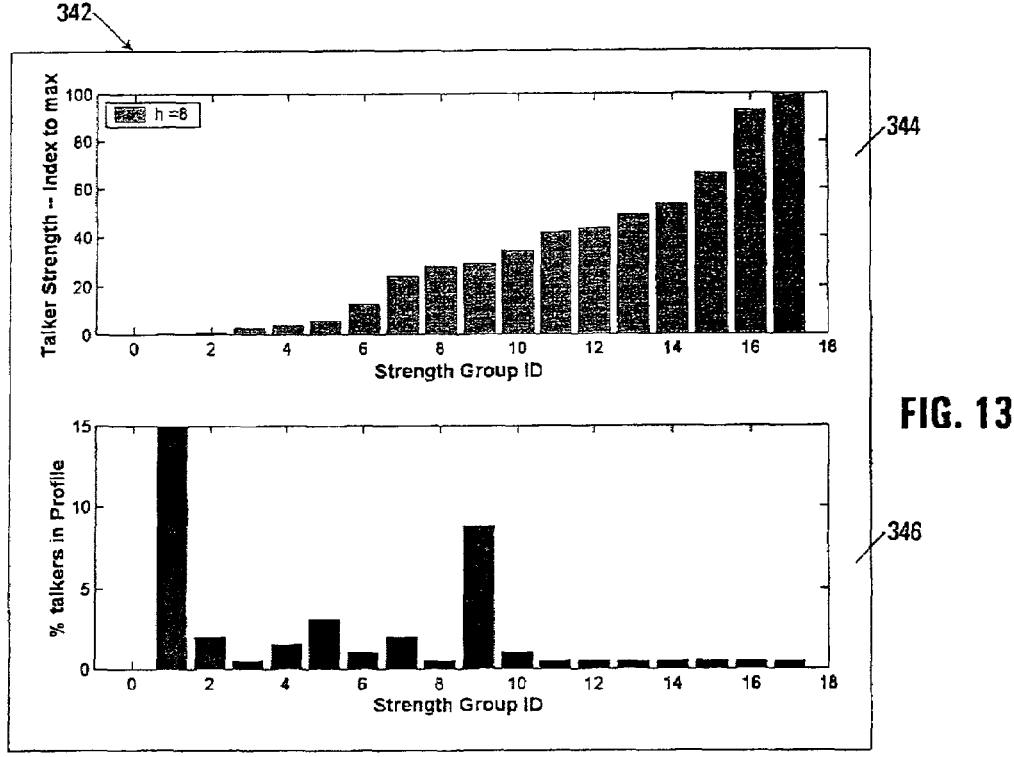
FIG. 13 is another exemplary talker strength diagram capable of being generated by the routine of FIG. 9.

As discussed above, a wide variety of plots and graphs may be generated in connection with the presentation of study results, and may be made accessible via the search results document. FIGS. 12 and 13, for example, illustrate a bubbleplot diagram 340 and a grouped talker strength diagram 342 capable of being generated in connection with the presentation of study results.

The bubbleplot diagram 340 may be useful in analyzing the communication strength of various talkers based upon different wearout factor influences. Each bubble plotted on the diagram represents a talking strength under two scenarios, a frequency scenario and a reach scenario, each of which is used for one of the orthogonal axes in the diagram. In this bubbleplot, moreover, talkers are grouped together by profile, such that all the talkers that meet this particular set of talker strengths (or are within a certain range) are grouped together, such that the size of the bubble plotted at a particular point on the diagram represents a relative size of the membership meeting the associated profile.

The use of a bubbleplot is helpful in determining contrast, as when the plotted points fall mostly near the diagonal of the diagram (represented at 341), then the strengths are fairly similar regardless of the wearout factors. As points spread away from the diagonal, however, the contrast and influence of wearout factors becomes more prevalent. In general, the more a plotted point falls toward the upper end of the normalized indexes along the horizontal and vertical axes of the diagram, the greater talker strength is represented.

It should be appreciated that a similar diagram may also be displayed wherein each individual Talker is represented by a unique data point on the plot. In addition, similar plots may also be used to display listening strengths.

The diagram in FIG. 13, as with the bubbleplot diagram in FIG. 12, groups similar individuals together into groups, and utilizes separate vertical bar graphs to represent (1) the normalized index in terms of talking strength for each group (graph 344), and (2) the relative membership of individuals within each group (graphs 346). In other studies, it may also be desirable to incorporate within bar graph 344 the relative indexes under each wearout factor scenario, as well.

Moreover, a wide variety of alternate graphs and reports may be generated to present information to users in a meaningful manner. Furthermore, different user interfaces and presentation formats may be used to present results to a user in a comprehensible manner.

It will be appreciated that programming and configuration of the data-mining engine, database management system, and quantitative analysis engine to implement the features disclosed herein would be well within the ability of one of ordinary skill in the art having the benefit of the instant disclosure. Moreover, additional software tools, as well as manual operations, may supplement or replace any of the aforementioned software components. Therefore, the invention is not limited to the particular hardware and software implementation disclosed herein.

In addition, as discussed above, once study results have been obtained, individuals may be selected via manual selection or via an automated mechanism, typically based upon a selection criterion based at least in part on communication strength. For those selected individuals, marketing activities may then be initiated using those individuals selected from the study based upon their determined communication strength, e.g., to direct a viral marketing encounter to such individuals, to further screen such individuals, to invite those individuals to participate in a focus group or market research project and/or to monitor the effectiveness of encounters with such individuals.

Various modifications may be made to the illustrated embodiments without departing from the spirit and scope of the invention. Therefore, the invention lies in the claims hereinafter appended. Moreover, while the invention may be used in connection with conducting studies regarding an endless array of domains of interest and study parameters, one exemplary study from which results can be generated is presented hereinafter as a working example.

Working Example

As an example illustrating the formulation and conduct of a study consistent with the invention, the archives of DejaNews newsgroups (forums) were data-mined to find messages that mentioned both the words "water" and "drinking"—a subject domain of potential marketing interest for water purification products and/or services.

Harvesting produced 2665 messages by 1889 different authors in 698 forums. Of these, one author and one forum were chosen by hand to be excluded from the study, based upon that author's use of "signature text" including the search words, regardless of the actual content of that author's messages. The eliminated forum was alt.hackers-.malicious, which was of no relevance.

A select step was performed to shape the domain into a more compact set for analysis:

Forums with fewer than 10 messages were dropped, leaving 58 forums to study. Only the 2553 messages in those forums and their 815 authors were retained for analysis. These authors were treated as potentially both talkers and listeners as explained below.

Among several alternative definitions, the following was chosen to constitute "a message from one person to another": If a person posted a message to a forum then everyone else in the forum heard it. Only members who actively posted to the forum and on the subject defined in the data-mining were included as listeners, to exclude lurkers or inactive members.

At this point the 731 persons who authored messages were classified. Among them, 193 were designated as "Talkers." They were considered a Talker if they had more than 1 message to at least some person. The remaining 538 individuals were designated "Listeners."

From the aforementioned selection step, the matrix of message activity (# of messages) from each Talker to each person was constructed. In this case the size of the matrix was 193×731, and was processed by Matlab 6 to solve the eigenvalue problem in the manner described above. The results generated included a set of relative strength weights assigned to each Talker, indexed to maximum. Listener strengths were also produced. The talkers with high strength ratings (e.g. talking strength indexes of at least 15) were designated "connectors", and from this selection criterion, 25 connectors were identified.

What is claimed is:

1. A method of assessing communication strength of individuals that participate in electronic communications, the method comprising:
(a) analyzing a plurality of electronic messages generated by a plurality of individuals to identify a plurality of conversations, wherein each conversation is associated with a talker and a listener, and wherein each talker and listener identified by a conversation is selected from the plurality of individuals;
(b) determining communication strengths of at least a subset of the plurality of individuals by modeling the plurality of conversations;
(c) selecting an individual from the plurality of individuals based upon the communication strength thereof;
(d) determining, from the plurality of conversations, a plurality of activity indicators, each activity indicator associated with first and second individuals from the plurality of individuals, and each activity indicator representing a level of messaging activity directed from the first individual associated with such activity indicator to the second individual associated with such activity indicator;
(e) identifying a first subset of the plurality of individuals as talkers for the purposes of the analysis based upon a talker criterion; and
(f) identifying a second subset of the plurality of individuals as listeners for the purposes of the analysis based upon a listener criterion;
wherein modeling the plurality of conversations includes populating a matrix with activity indicators associated with messaging activity directed front the individuals identified as talkers based upon the talker criterion:
wherein determining the communication strengths includes simultaneously solving talking strengths and listening strengths for at least a subset of the plurality of individuals using the matrix; and
  wherein simultaneously solving talking strengths and listening strengths includes solving an eigenvalue problem using the relationships:

$$v = Wu$$

$$u = W^T v$$

wherein
  W = the matrix;
  $W^T$ = the transpose of the matrix;
  u = a vector of talking strengths; and
  v = a vector of listening strengths.

2. The method of claim 1, further comprising harvesting the plurality of electronic messages based upon a domain of interest.

3. The method of claim 2, wherein harvesting the plurality of electronic messages includes searching at least one message archive to identify the plurality of electronic messages and creating a local message archive from which information regarding the plurality of electronic messages can be obtained during analysis.

4. The method of claim 3, wherein the message archive from which the electronic messages are harvested includes at least one of a news archive, a forum archive, a mailing list archive, a chat archive, an instant messaging archive, a telephone record archive and an email archive, and wherein each of the plurality of messages is selected from the group consisting of a message post, an email, a chat post, an instant message, and a telephone record.

5. The method of claim 2, further comprising selecting a study domain from the domain of interest based upon at least one study parameter.

6. The method of claim 1, wherein each activity indicator comprises a conversation count representative of the number of conversations directed from the first individual associated with such activity indicator to the second individual associated with such activity indicator.

7. The method of claim 1, wherein populating the matrix includes arranging in different areas of the matrix activity indicators associated with messaging activity directed to individuals identified as talkers based upon the talker criterion, and activity indicators associated with messaging activity directed to individuals identified as listeners based upon the listener criterion.

8. The method of claim 1, further comprising scaling each activity indicator using a wearout factor prior to determining the communication strengths.

9. The method of claim 8, wherein determining the communication strengths determines a first set of communication strengths, and wherein the method further comprises determining a second set of communication strengths after scaling the activity indicators using a second wearout factor.

10. The method of claim 9, further comprising generating a diagram that contrasts the first and second sets of communication strengths.

11. The method of claim 10, wherein the diagram includes first and second orthogonal axes respectively representing the first and second sets of communication strengths, and wherein the diagram includes a plurality of data points, each representing the communication strengths in each of the first and second sets of communication strengths determined far an individual from the plurality of individuals.

12. The method of claim 11 wherein the diagram further includes bubbles representing groups of individuals having like communication strength characteristics, wherein the size of each bubble is representative of the number of individuals within the group of individuals represented by such bubble.

13. The method of claim 1, wherein modeling the plurality of conversations includes expressing from a model the propositions that a strong talker talks frequently to strong listeners, and that a strong listener listens frequently to strong talkers.

14. The method of claim 1, wherein determining the communication strength for an individual includes determining at least one of a talking strength and a listening strength for such individual.

15. The method of claim 14, wherein selecting an individual from the plurality of individuals based upon the communication strength thereof includes identifying the individual as a connector based at least upon the talking strength of such individual.

16. The method of claim 15, further comprising contacting the individual to perform a marketing activity therewith.

17. The method of claim 16, further comprising initiating an encounter with the individual in a viral marketing context.

18. The method of claim 16, further comprising performing market research with the individual.

* * * * *

UNITED STATES PATENT AND TRADEMARK OFFICE
CERTIFICATE OF CORRECTION

PATENT NO. : 7,143,054 B2
APPLICATION NO. : 09/897577
DATED : November 28, 2006
INVENTOR(S) : Michael Emmett Doherty It is certified that error appears in the above-identified patent and that said Letters Patent is hereby corrected as shown below:

Column 14, line 17, delete "$W_{ijk}^t$=talk activity for $U_i$ with respect to $T_{jk}$" and insert -- $W^t_{ijk}$ = talk activity for $U_i$ with respect to $T_{jk}$ --.

Column 14, line 18, delete "$W_{ijk}^l$=listen activity for $U_i$ with respect to $T_{jk}$" and insert -- $W^l_{ijk}$ = listen activity for $U_i$ with respect to $T_{jk}$ --.

Column 14, line 22, delete "$W_{ijk}^t$ may be defined in a number of manners" and insert -- $W^t_{ijk}$ may be defined in a number of manners --.

Column 14, line 25, delete "$W_{ijk}^t$=1 if $U_i$ submitted a message to $T_{jk}$, 0 otherwise (1a)" and insert -- if $U_i$ submitted a message to $T_{jk}$, 0 otherwise (1a) --.

Column 14, line 28, delete "$W_{ijk}^t$=1 if $U_i$ submitted initial message of $T_k$, 0 otherwise (1b)" and insert -- $W^t_{ijk}$ = 1 if $U_i$ submitted initial message of $T_{jk}$, 0 otherwise (1b) --.

Column 14, line 33, delete "$W_{ijk}^t$=percentage of messages in $T_{jk}$ submitted by $U_i$ (1c)" and insert -- $W^t_{ijk}$ = percentage of messages in $T_{jk}$ submitted by $U_i$ (1c) --.

Column 14, line 36, delete "$W_{ijk}^t$=number of messages in $T_{jk}$ submitted by $U_i$ (1d)" and insert -- $W^t_{ijk}$ = number of messages in $T_{jk}$ submitted by $U_i$ (1d) --.

Column 14, line 38, delete "$W_{ijk}^l$ may be defined in a number of manners," and insert -- $W^l_{ijk}$ may be defined in a number of manners, --.

Column 14, line 40, delete "$W_{ijk}^l$=1 if $U_i$ is a member of $F_j$, 0 otherwise (2a)" and insert -- $W^l_{ijk}$ = 1 if $U_i$ is a member of $F_j$, 0 otherwise (2a) --.

UNITED STATES PATENT AND TRADEMARK OFFICE
CERTIFICATE OF CORRECTION

| | | |
|---|---|---|
| PATENT NO. | : 7,143,054 B2 | Page 2 of 2 |
| APPLICATION NO. | : 09/897577 | |
| DATED | : November 28, 2006 | |
| INVENTOR(S) | : Michael Emmett Doherty | |

It is certified that error appears in the above-identified patent and that said Letters Patent is hereby corrected as shown below:

Column 14, line 43, delete "$W_{ijk}^l = 1$ if $U_i$ submitted a message in $T_{jk}$, 0 otherwise (2b)" and insert -- $W^l_{ijk} = 1$ if $U_i$ submitted a message in $T_{jk}$, 0 otherwise (2b) --.

Column 14, line 47, delete "$W_{ijk}^l$ = percentage of messages in $T_{jk}$ submitted by $U_i$ (2c)" and insert -- $W^l_{ijk}$ = percentage of messages in $T_{jk}$ submitted by $U_i$ (2c) --.

Column 14, line 51, delete "$W_{ijk}^l$ = number of messages in $T_{jk}$ submitted by $U_i$ (2d) and insert -- $W^l_{ijk}$ = number of messages in $T_{jk}$ submitted by $U_i$ (2d) --.

Signed and Sealed this

Seventeenth Day of June, 2008

JON W. DUDAS
*Director of the United States Patent and Trademark Office*